CIRCUIT INTERRUPTERS

Filed April 29, 1958 7 Sheets-Sheet 1

WITNESSES

INVENTORS
Robert E. Friedrich &
Harry J. Lingal
BY
Willard R. Crout
ATTORNEY

May 8, 1962 R. E. FRIEDRICH ETAL 3,033,962

CIRCUIT INTERRUPTERS

Filed April 29, 1958 7 Sheets-Sheet 2

United States Patent Office 3,033,962
Patented May 8, 1962

3,033,962
CIRCUIT INTERRUPTERS

Robert Edmund Friedrich, Baldwin, and Harry J. Lingal, Pittsburgh, Pa., assignors to Westinghouse Electric Corporation, East Pittsburgh, Pa., a corporation of Pennsylvania Filed Apr. 29, 1958, Ser. No. 731,706
23 Claims. (Cl. 200—145)

This invention relates to circuit interrupters in general, and, more particularly, to arc-extinguishing structures and mounting arrangements therefor.

A general object of the present invention is to provide an improved circuit interrupter which will be adaptable for performing more effectively over wider voltage and current ranges than circuit interrupters heretofore employed in the industry.

Another object of the invention is to provide an improved mounting arrangement for a circuit interrupter in which a dead-tank construction is employed.

Still a further object of the present invention is to provide an improved circuit interrupter of the dead-tank type in which the dimensions of the enclosing tank structure are reduced to a minimum so that the volume of confined fluid may also be a minimum, to avoid using a greater quantity of relatively expensive arc-extinguishing fluid than necessary.

Another object of the invention is to provide an improved mounting tank arrangement for a multiple interrupter type of circuit interrupter in which the spacing distances are at a minimum, taking advantage of the increased dielectric strength of the enclosed arc-extinguishing fluid.

A further object of the invention is to provide an improved high-voltage circuit interrupter in which the mechanical operating arrangement for the movable contact structure may be of simplified construction.

A further object of the present invention is to provide an improved multiple-break type of circuit interrupter in which simultaneous opening and closing operations are achieved within all of the arc-extinguishing interrupter structures.

A further object of the invention is to provide an improved arc-extinguishing unit which may constitute one of many such units employed in a high-voltage circuit interrupter, the construction of such arc-extinguishing unit being such that it is readily adaptable to be employed as one of many such units, and may be readily mechanically and pneumatically connected to other such similar units.

A further object of the present invention is to provide an improved tank-type mounting construction for a multiple-break type of circuit interrupter, in which improved inspection and maintenance means are provided to permit ready withdrawal of a multiple-unit arc-extinguishing assemblage from the tank structure for external examination preliminary to subsequent maintenance operations.

Further objects and advantages will readily become apparent upon reading the following specification, taken in connection with the drawings, in which.

Figure 6:
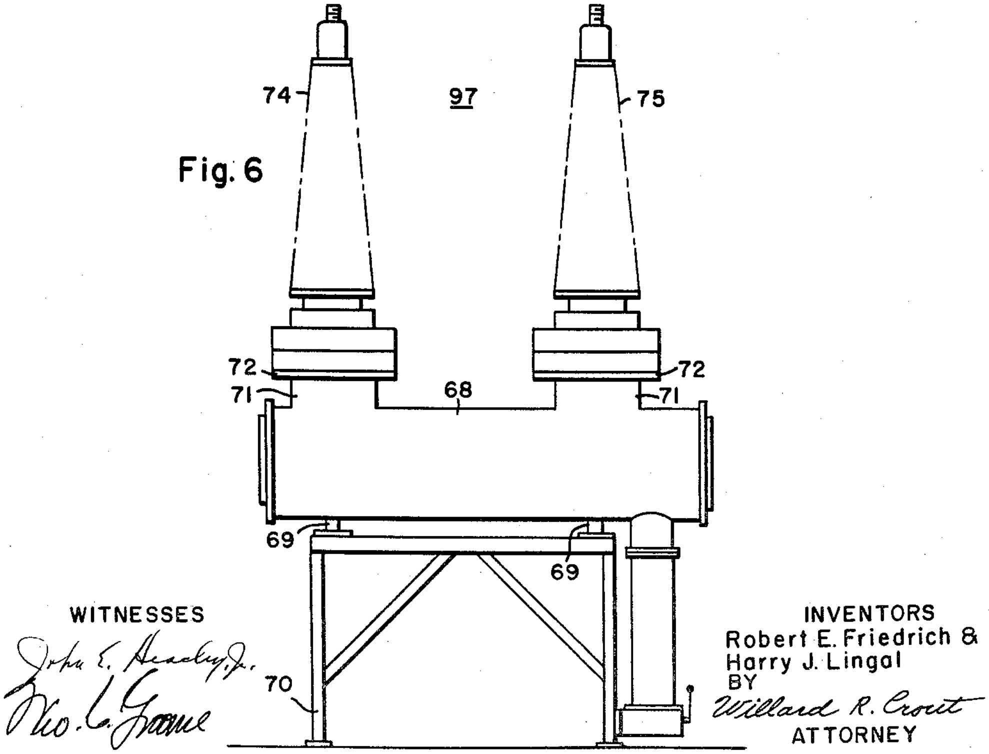
FIG. 6 is an alternative mounting arrangement, which may be employed instead of the mounting arrangement of FIG. 1, the view being a side elevational view of a circuit interrupter embodying principles of the present invention.
Figure 7:
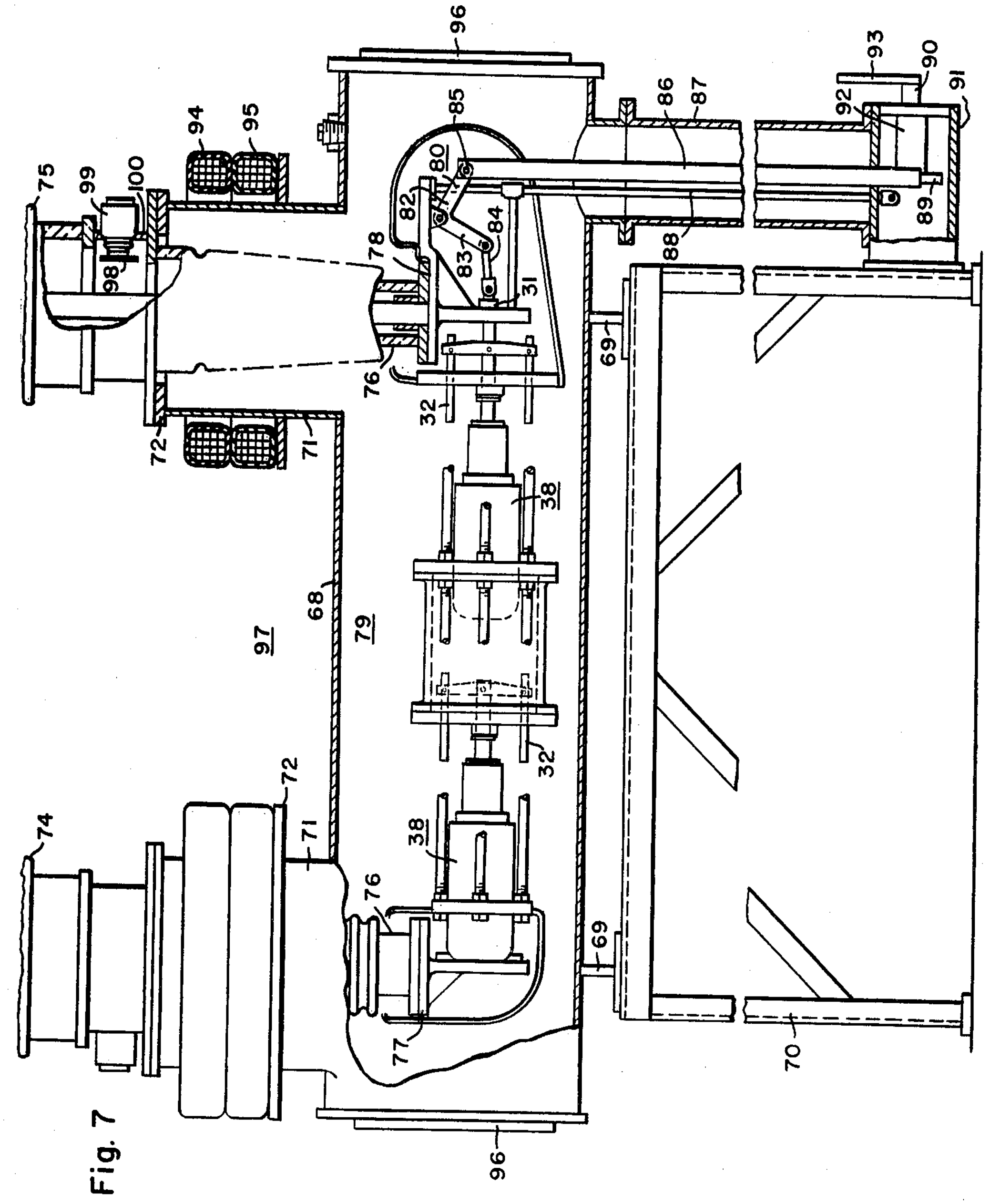
Figure 8:
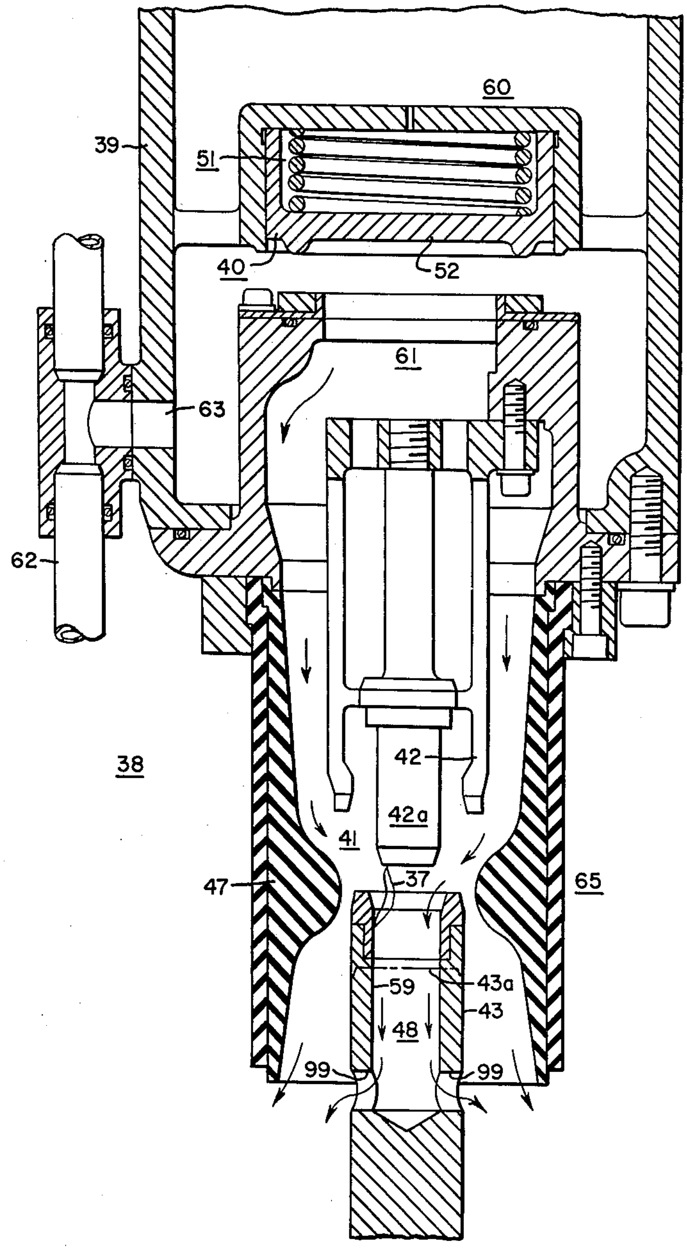

FIG. 7 is a considerably enlarged view, corresponding to that of FIG. 6, but portions of the tank structure being broken away in vertical section to illustrate the position of the interiorly disposed arc-extinguishing assemblage, and the method of contact operation; and, FIG. 8 is an enlarged view of the separable contact structure shown at an intermediate point in the opening operation at the time of arc-extinction.

Figure 1:
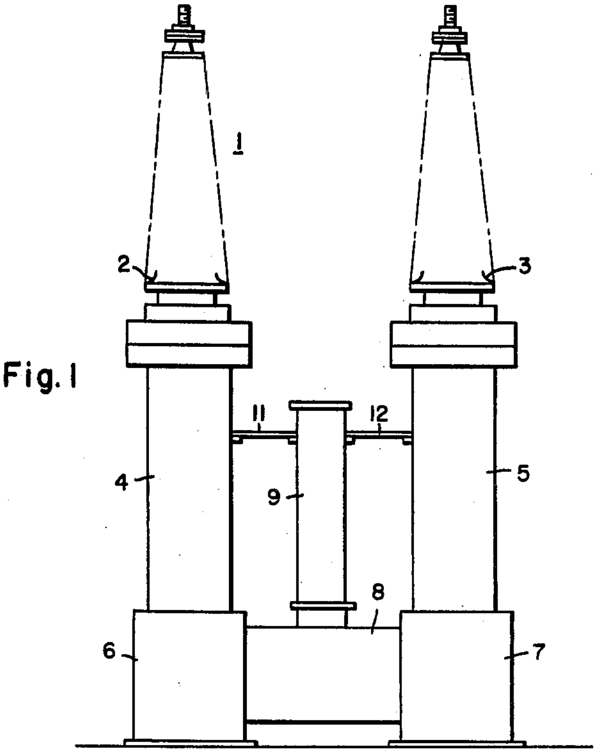
FIGURE 1 is a side elevational view of a circuit interrupter employing the principles of the present invention.

Referring to the drawings, and more particularly to FIG. 1 thereof, the reference numeral 1 generally designates a circuit interrupter of the high-voltage type including a pair of terminal bushings 2, 3, extending downwardly interiorly within generally cylindrical tank components 4, 5. The tank components 4, 5 are supported upon generally box-shaped housing structures 6, 7, which are bridged by a horizontally extending cylindrical tank 8.

Extending upwardly from the horizontally extending, generally cylindrical tank 8 is a tubular, metallic, operating housing 9, interiorly of which is an insulating, rotatable, operating shaft 10. Preferably, braces 11, 12 may be employed between the vertically-extending, generally-cylindrical tanks 4, 5 and the tubular operating housing 9 for purposes of rigidity.

Figure 2:
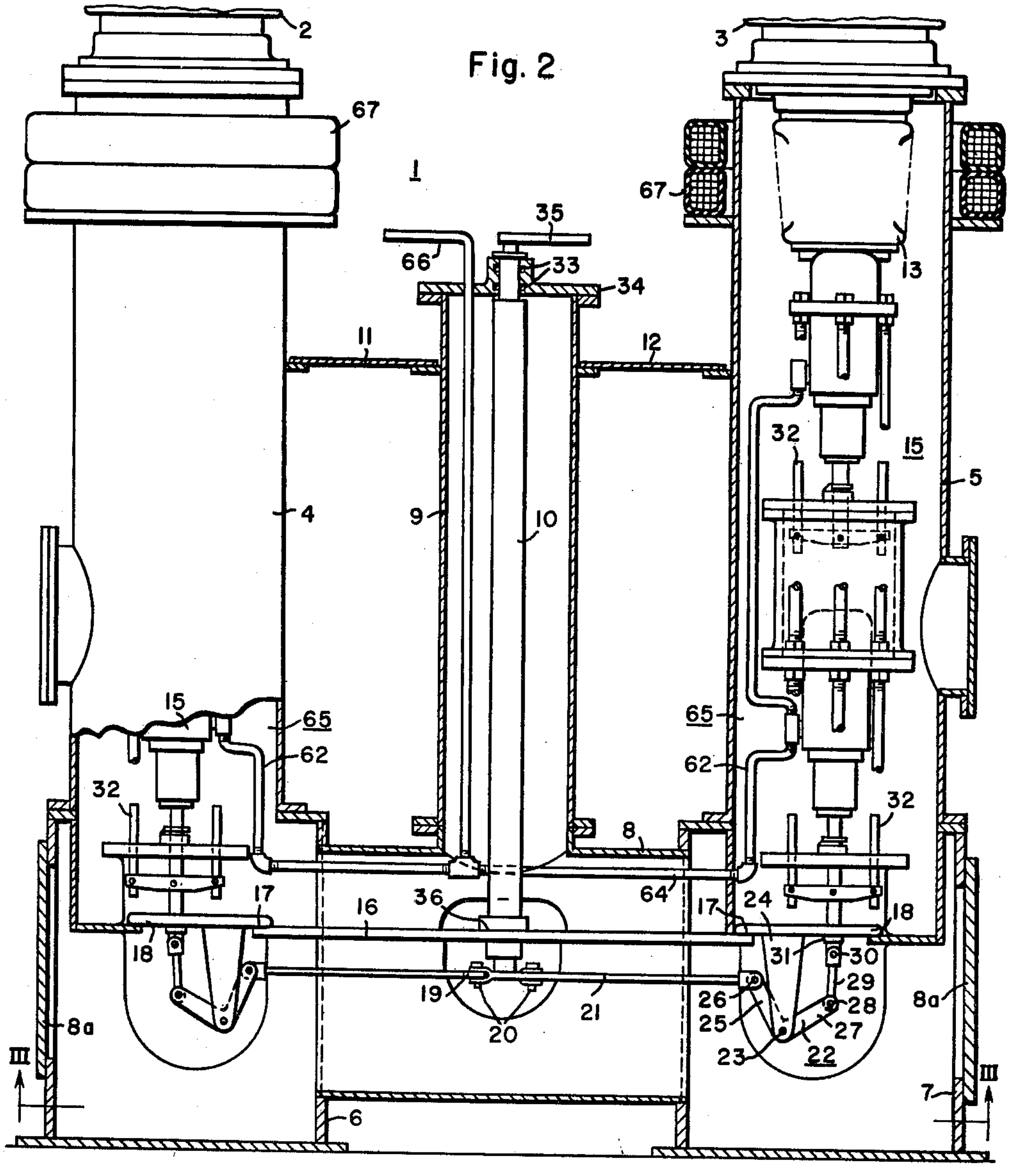
FIG. 2 is a considerably enlarged view corresponding to FIG. 1, but broken away partially in vertical section to disclose the internal arc-extinguishing assemblages, and the manner of operating the contact structures.
Figure 3:
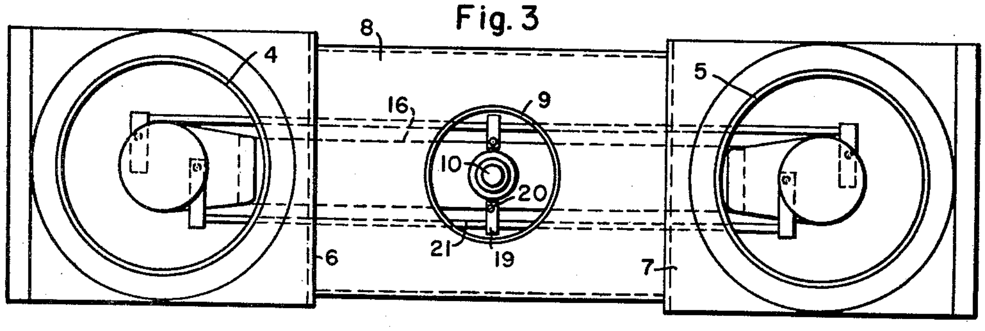
FIG. 3 is a somewhat diagrammatic view taken substantially along the line III—III of FIG. 2 in the direction of the arrows.

Referring more particularly to FIG. 2 of the drawings, which shows the internal components of the interrupter 1, it will be noted that depending from the interior end 13 of each terminal bushing 2, 3 is an arc-extinguishing assemblage, generally designated by the reference numeral 15. A longitudinally-extending conducting blade 16 is bolted, as at 17, to a support plate 18 affixed to the lower end of each arc-extinguishing assemblage 15 for electrically interconnecting the two arc-extinguishing assemblages 15. Thus, generally, the electrical circuit extends downwardly through the terminal bushing 2, through the left-hand, arc-extinguishing assemblage 15, as viewed in FIG. 2, through the conducting blade 16, and upwardly through the right-hand, arc-extinguishing assemblage 15, through the right-hand terminal bushing 3 to the external circuit.

To effect simultaneous opening and closing operations of both arc-extinguishing assemblages 15, the insulating operating shaft 10 has fixedly secured thereto, at the lower end thereof, laterally jutting crankarms 19 (only one of which is shown). Each crankarm 19 is pivotally connected, as by a pivot pin 20, to an operating link 21, the latter effecting rotative travel of a bell crank 22, the latter being pivotally mounted, as at 23, to a pair of brackets 24 supported downwardly from the support plate 18.

One arm 25 of the bell crank 22 is pivotally connected, as at 26, to one end of the link 21, whereas the other arm 27 of the bell crank 22 is pivotally connected, as at 28, to a link 29, the upper end of which is pivotally connected, as at 30, to a yoke 31, which operates two insulating operating rods 32 extending lengthwise of the arc-extinguishing assemblage 15.

The upper end of the insulating rotatable operating shaft 10 extends, in a gas-tight manner, as provided by gaskets 33, through a closure cap 34, disposed at the upper end of the tubular operating housing 9, and has fixedly secured thereto, at its upper extremity, an external crankarm 35 adapted for rotative operating movement.

Where a plurality of circuit interrupters 1 are employed for controlling the different phases of a transmission circuit, the several crankarms 35 controlling operation of each pole unit may be interconnected by a longitudinally extending drive shaft, not shown. Thus a common operating mechanism may be employed to effect simultaneous rotative motion of the several crankarms 35 to effect thereby simultaneous opening and closing operations of the arc-extinguishing assemblages 15 associated with each pole unit. A pole unit constitutes a single circuit interrupter 1 controlling one phase of a transmission circuit, as is obvious.

From the foregoing, it will be apparent that rotative operation of the external crankarm 35 will rotate the operating shaft 10, supported at a lower bearing 36 through the conductor plate 16, and will hence cause rotative movement of the two crankarms 19 extending diametrically in opposite directions at the lower end of operating shaft 10. The rotative movement of the crankarms 19 will effect, through the linkage 21, opening or closing rotative movement of the bell cranks 22 disposed at the lower ends of the assemblages 15.

Figure 4A:
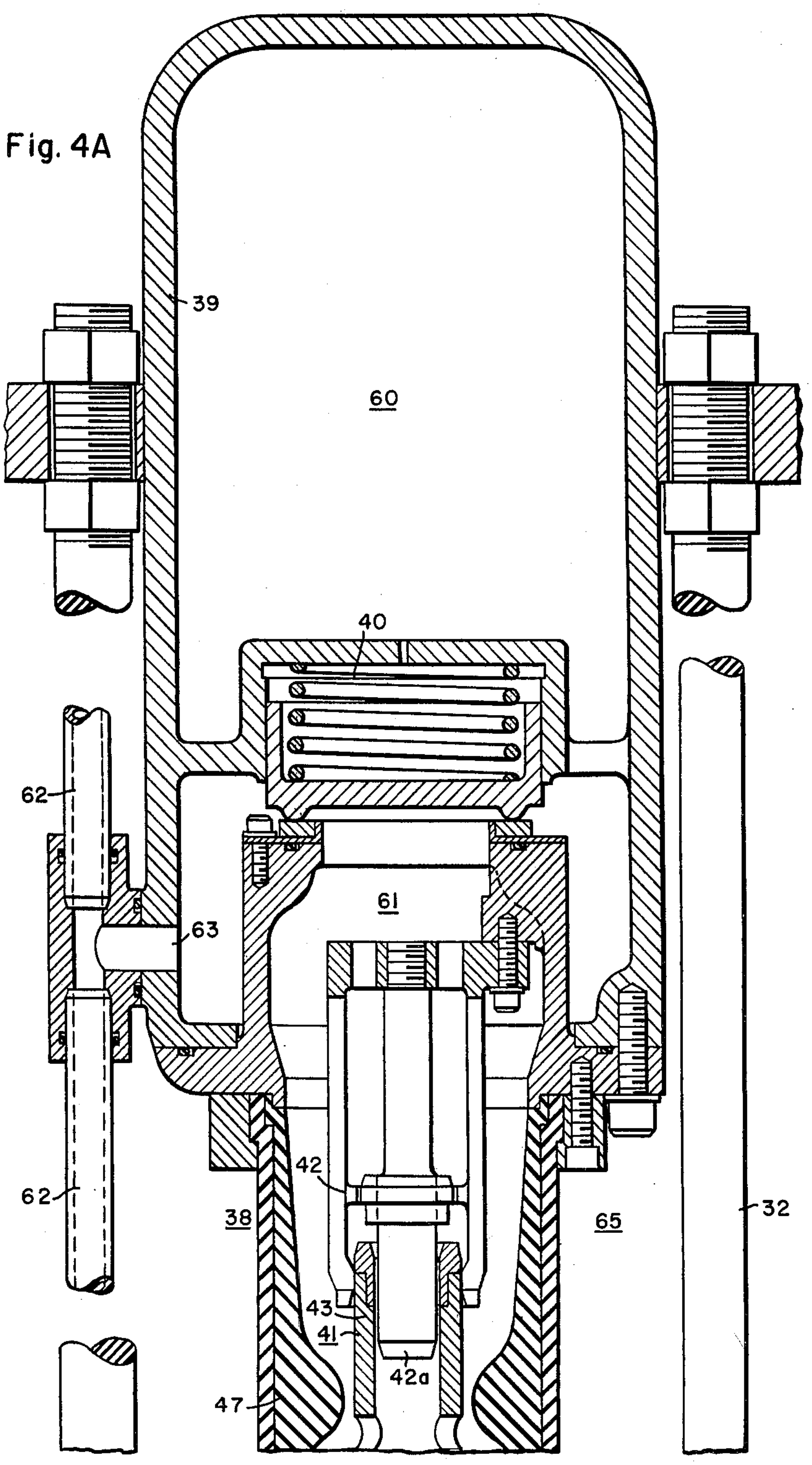
FIGS. 4A and 4B are vertical sectional views taken through one of the elemental arc-extinguishing units constituting one of many such units in an arc-extinguishing assemblage, the contact structure being illustrated in the closed circuit position.
Figure 4B:
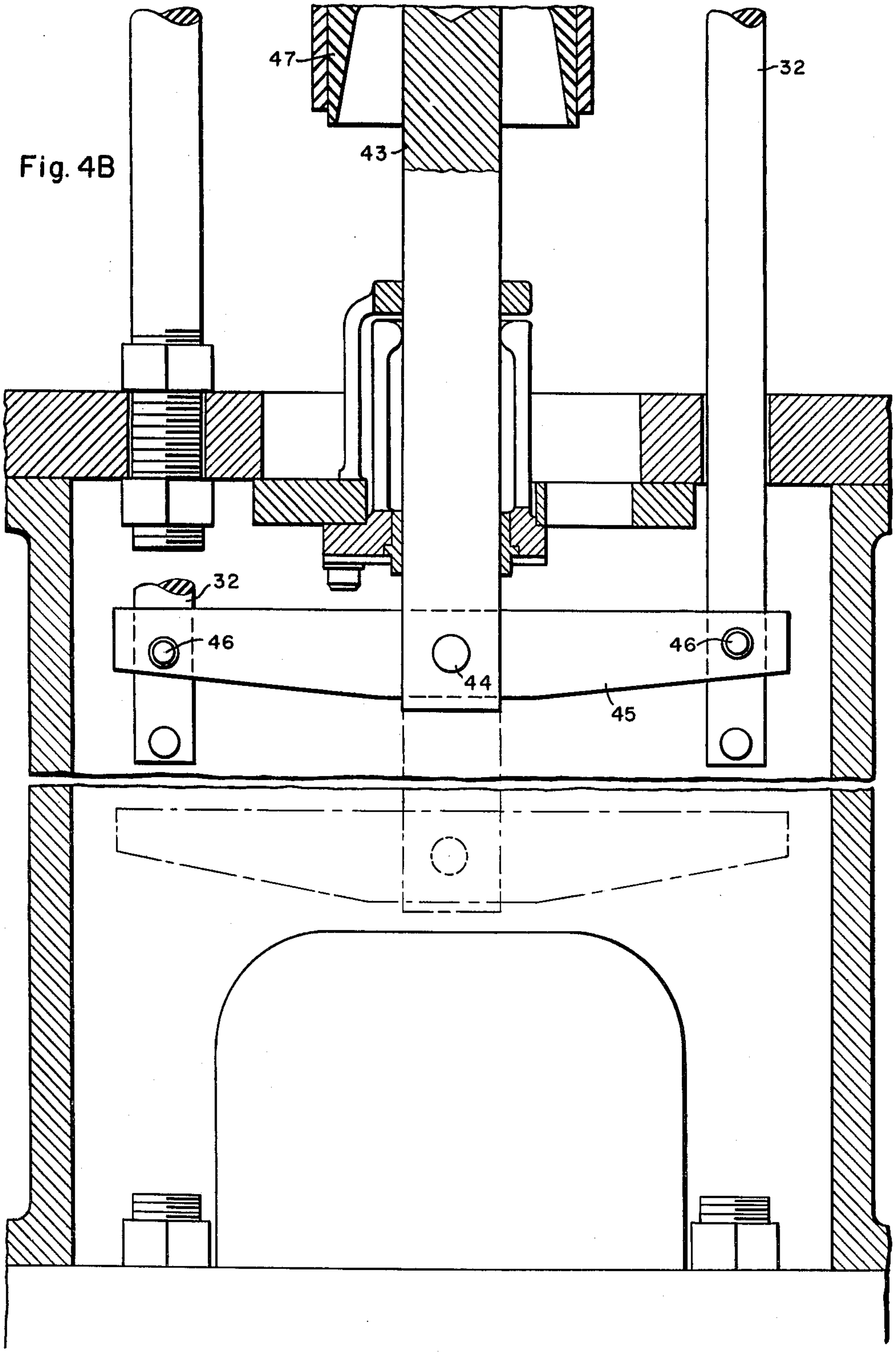

With reference to FIG. 4A, it will be noted that each arc-extinguishing assemblage 15 includes a plurality, in this particular instance two, arc-extinguishing units 38. Each arc-extinguishing unit 38 includes a high-pressure fluid reservoir 39, a blast-valve structure 40, a contact structure 41, the latter including a relatively stationary contact 42 and a movable contact 43. The several movable contacts 43 are fixedly secured, as at 44, to cross members 45, the latter being fixedly secured, by bolts 46, to the two insulating operating rods 32.

Thus, rotation of the bell crank 22 effects, through the link 29 and yoke 31 (FIG. 2), longitudinal reciprocal movement of the pair of insulating operating rods 32 associated with each arc-extinguishing assemblage 15. The longitudinal movement of the pair of operating rods 32 effects, through the several cross-members 45, opening and closing movement of the movable contacts 43. The separation of each movable contact 43 from its cooperable relatively stationary contact 42 will establish an arc between arcing horn 42*a* and movable contact 43 within an orifice structure 47, through which is ejected a blast of fluid, as more fully brought out hereinafter.

Figure 5:
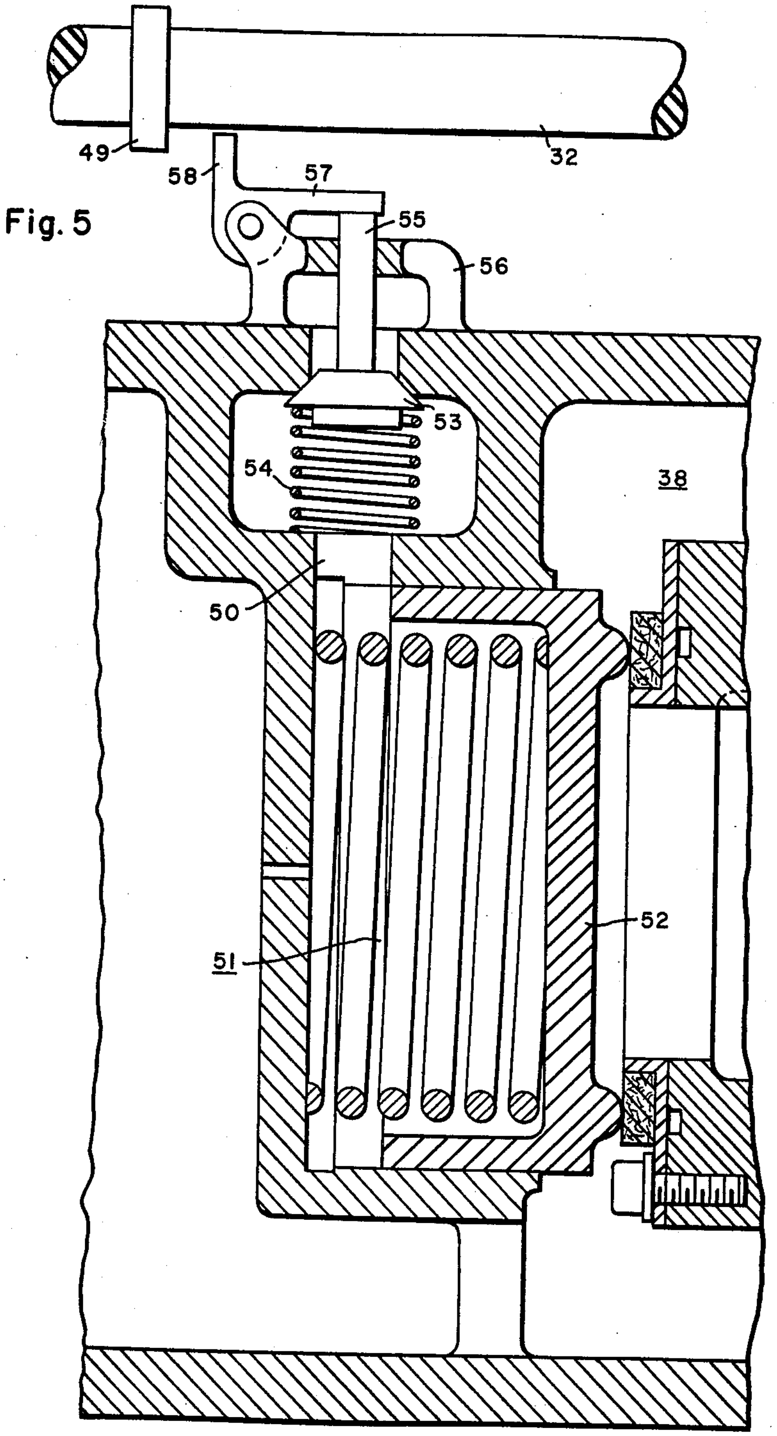
FIG. 5 is a fragmentary view, partially in section, illustrating the method of blast-valve operation in each of the several arc-extinguishing units.

With reference to FIG. 5, it will be noted that one of the two operating rods 32 is provided with a plurality of actuating sleeves 49 adjustably secured thereto, one actuating sleeve 49 being provided for each arc-extinguishing unit 38. A passage 50 leads out of the region 51 back of the blast valve 52, and is controlled by a pilot valve 53, biased to the closed position by a compression spring 54. The valve stem 55 is guided by a perforated, inverted, cup-shaped bracket member 56, and has its extremity engageable with a valve-actuating lever 57. The lever 57 has a lug portion 58, which is engaged by the actuating sleeve 49 during the opening and closing longitudinal movements of the operating rod 32. During the opening operation, the operating rod 32 moves to the right, as viewed in FIG. 5, opening the movable contact 43, as previously explained, and the actuating sleeve 49 secured thereabout engages the lug 58 causing clockwise rotative movement of the valve lever 57, depressing the pilot valve 53 to exhaust the fluid out of the region 51 behind the blast valve 52. Since high pressure fluid exists within the region 60, within high-pressure reservoir 39, the blast valve 52 will be quickly forced open, and compressed fluid will thereby pass out of the high-pressure reservoir 39 through the passage 61, and through the orifice structure 47 to effect extinction of the arc established between contacts 42 and 43.

To maintain a constant supply of high-pressure fluid within each of the high-pressure reservoirs 39, a high-pressure feed pipe 62 is provided, having a plurality of branches 63 (FIG. 4A) feeding the several high-pressure reservoirs 39. The high-pressure feed pipes 62 extend longitudinally of the assemblages 15, and are interconnected by a connecting pipe 64 (FIG. 2), the latter being pneumatically connected with a vertically extending pipe 66 passing through the closure cap 34 (FIG. 2) to an external supply of compressed fluid.

From the foregoing, it will be apparent that during the opening operation the crankarm 35 is rotated, to effect through the linkage hereinbefore described, longitudinal movement of both pairs of operating rods 32 associated with the two arc-extinguishing assemblages 15. The pair of operating rods 32 associated with each arc-extinguishing assemblage 15 causes establishment of an arc within each arc-extinguishing unit 38, as previously explained, and the actuating sleeves 49 on one of the rods 32 effect opening of each pilot valve 53, dumping the fluid from in back of the associated blast valve 52 for that particular unit 38. The flow of compressed fluid out of the reservoir 39 through the orifice 47 effects extinction of the established arc, and this fluid is exhausted into the region 65, which is a part of the interior region disposed within the entire grounded tank structure. Suitable means, not disclosed, may effect a withdrawal of fluid out of the region 65 when the pressure within region 65 becomes too high as a result of many operations. As will be obvious, this fluid may be recompressed and subsequently forced into the high-pressure feed pipe 66.

With reference to FIG. 8, which shows the contact structure 41 at the time of arc-extinction, it will be noted that the established arc 37 has its upper terminal at the arcing horn 42*a*, as explained previously, and that venting means 48, including a hollow tip portion 59 and lateral venting openings 99 are associated with the movable rod-shaped contact 43. As a result, the gas blast vents through the hollow tip portion 59 for additional arc-extinguishing effectiveness.

Low-current arcs 37 may be extinguished at the position shown, whereas high-current arcs will be slightly more difficult to extinguish, as well known, and necessitate a greater contact separation distance, as indicated by the dotted position 43*a* of the movable contact 43.

Although the circuit interrupting structure herein described is suitable for use with many arc-extinguishing fluids, it is particularly adaptable for use with a relatively expensive arc-extinguishing fluid, such as sulfur, hexafluoride gas ($SF_6$) or selenium hexafluoride ($SeF_6$) either employed separately or mixed together, or admixed with one of the gases, air, carbon dioxide, nitrogen, argon, or helium. Since these gases are relatively expensive, it is desirable to utilize a minimum quantity of such gas, and for this reason the described tank structure is particularly useful. It is to be noted that the clearances between the arc-extinguishing assemblages 15 and the inner walls of the vertically-extending cylinders 4, 5 is a minimum. In this respect, advantage can be taken of the very high dielectric strength of the aforesaid gases.

Also, with the structure described, current transformers 67 may be employed, encircling the upper ends of the cylinders 4, 5 for relaying protection. It will be noted that the entire tank structure is at ground potential, and that the upper ends of the terminal bushings 2, 3 are well elevated above the ground level. The operating structure is particularly suitable for interconnecting a plurality of pole units, as mentioned.

FIG. 6 shows an alternate form of mounting construction involving a generally cylindrically-shaped tank 68 supported upon a pair of supports 69, the latter resting upon an angle-iron framework 70. Extending upwardly adjacent the opposite ends of the horizontally extending tank 68 is a pair of cylindrical supports 71 having upper flanges 72, upon which rest a pair of terminal bushings 74, 75. As shown in FIG. 7, the lower interior ends 76 of the terminal bushings 74, 75 are fixedly secured to conducting end-support brackets 77, 78, between which extend an arc-extinguishing assemblage, generally designated by the reference numeral 79, and including a plurality of serially related arc-extinguishing units 38. The units 38 have previously been described; consequently a further description thereof appears unnecessary.

To effect horizontal, reciprocal, opening and closing motion of the insulating operating rods 32, connected adjacent one end by the yoke 31, there is provided a bell crank 80 having a pair of crankarms 82, 83. The crankarm 83 is pivotally connected by a link 84 to the yoke 31. The crankarm 82 of bell crank 80 is pivotally connected, as at 85, to an insulating operating rod 86, the latter extending downwardly through a tubular housing 87. Also extending downwardly through the tubular housing 87 is a high-pressure feed pipe 88, which provides an adequate supply of high-pressure extinguishing fluid to the several reservoirs 39 associated with the arc-extinguishing units 38, in a manner previously described.

The lower end of the insulating operating rod 86 is pivotally connected to a crankarm 89, the latter being fixedly secured, as by welding, to a rotatable drive shaft 90 extending exteriorly of a box-like enclosure 91 by means of a gas-tight seal 92. The seal 92 may be of the type set forth in United States patent application filed April 9, 1956, Serial No. 576,875, now United States Patent No. 2,889,434, issued June 2, 1959 to Harry J. Lingal, and assigned to the assignee of the instant application.

During the opening operation, suitable means are employed to effect external operation of a crankarm 93, affixed to the extremity of the drive shaft 90, to cause rotation of the same. The internally disposed crankarm 89 also rotates with the drive shaft 90, and in doing so effects upward movement of the operating rod 86. The upward movement of the operating rod 86 is translated, through the linkage 80, into horizontal opening movement of the yoke 31 and the operating rods 32. The horizontal opening motion of the operating rods 32 not only effects arc establishment in the several units 38 in a manner previously described, but also effects pilot-valve operation 53 in a manner as heretofore explained. The establishment of the arcs and the extinguishment thereof in the arc-extinguishing units 38 occurs in a manner heretofore described; consequently, a further description thereof appears unnecessary.

It will be noted that again current transformers 94 are employed externally of the supporting tubes 71, mounted upon flanges 95 affixed thereto. Also, end inspection plates 96 are employed to permit inspection of the units, and removal thereof laterally out either end of the cylindrical grounded housing 68.

From the foregoing description of the invention, it will be readily apparent that there is provided an improved circuit interrupter having an improved and safe mounting construction. By having the enclosing tanks at ground potential, safety is insured for the operating personnel. In addition, the grounded structures result in a sturdy and rigid circuit-interrupting device, readily capable of withstanding earthquake shocks and other disturbances.

The use of a relatively expensive gas is rendered economical by the present invention since a very small volume of gas is utilized, and the dielectric strength of such gas is employed to permit the relatively close spacing of parts at different potential. Maintenance and inspection is facilitated by having the end inspection plates 96. In the case of the interrupter 97 of FIGS. 6 and 7, the framework 70 insures that the upper ends of the terminal bushings 74, 75 are maintained at an adequate elevated distance above ground level. It will also be noted that the operating mechanisms include rotatable shafts 10, 90, thereby facilitating the use of simple gas-tight seals 33, 92.

From the foregoing, it will be apparent that there is described two arrangements of a dead-tank type of fluid or gas-filled breaker having minimum dimensions and thus affording a minimum gas content. The feasibility of the two arrangements has been made evident by many tests, which showed that a considerable amount of voltage, both 60 cycle and impulse, could be withstood on a relatively small clearance, when utilized, for example, with $SF_6$ gas. These tests prove that it is possible to obtain both the 60-cycle and standard impulse test values corresponding to 230/196 kv. breaker ratings on approximately 6½ inches clearance between a round conductor of 3 inches diameter symmetrically located within a surrounding cylinder of only 16 inches diameter.

It will be noted that with the arrangements described, the structures are adaptable of manufacture by employing welded components making up a tank assembly, consisting of several round tubes and rectangular housings. Single or multiple-break interrupters may be employed, and may be located within the vertical tubes 4, 5, as illustrated in FIG. 1, with sufficient clearance to withstand the specified voltage rating of the breaker. A distinct advantage is that the bushings in both structures can be of rather conventional condenser type, that is, liquid-filled or gas-filled. The operation of the contacts is easily obtained by the described system of insulating and metal rods. It is to be noted that a minimum of gas pressure will be required to maintain the voltages required. For example, when $SF_6$ gas is employed, tests have indicated that a pressure of only 20 to 30 pounds per square inch is necessary to withstand the aforementioned voltages, hence the steel-tank structures will not be subjected to high pressures. Inspection and removal of the contact parts is obtained by the removal covers 8*a*, 96 on both sides of the pole units 1, 97 respectively.

There have been disclosed two arrangements, one involving the units disposed vertically, and the other involving units disposed horizontally. In the case of the interrupter 97 of FIGS. 6 and 7, the contact assembly may be removed from the end of the horizontal tank by opening manhole covers 96 at each end, and disconnecting the interrupter units at each end from the bushings 74, 75, from the auxiliary piping and operating rod. The latter interrupter 97 is mounted on a frame to obtain the proper clearances to ground required by the safety code. The interrupter of FIGS. 6 and 7 may be readily connected to additional interrupters 97 by a horizontal tie-rod, not shown, connected to the external crankarms 93. The insulating operating rod 86 is contained within a gas-filled pipe 87, as shown. The dimensions compare very favorably with those of oil circuit breakers, yet the volume employed in the interrupter of the present invention is a minimum to save expense when a relatively expensive gas is employed. The terminal bushing 75 in FIG. 7 is shown as having a potential tap 98. The bushing may be of the gas-filled type, and the potential tap 98 may be a curved, cylindrical plate mounted on the end of a low-voltage bushing 99 inserted in the wall of the bushing flange 100.

Certain features of the gas-filled terminal bushing 75 are set forth and claimed in United States patent application filed December 2, 1959, Serial No. 856,775 by Robert E. Friedrich and James H. Frakes and assigned to the assignee of the instant application.

Particular advantages of the foregoing types of circuit interrupters 1, 97 are that they are less expensive than corresponding oil circuit breakers, yet have all of the many attractive features of an oil circuit breaker construction. These advantageous features include isolation of high-voltage parts by elevation, breaker terminals at the same height, current transformers at ground potential located on either side of the interrupter units, live interrupter parts contained within a dead-tank, and easy removal of the contact parts for inspection and maintenance. In addition, where a relatively expensive gas is employed, the volume of the gas required is such that the cost is comparable with that of the oil in a three-pole oil circuit breaker.

Certain features of the present invention pertaining to the tank mounting arrangements are set forth and claimed in United States patent application, Serial No. 729,368, filed April 18, 1958, U.S. Patent 3,009,042, issued November 14, 1961, to Jack E. Schrameck and Richard E. Kane and assigned to the assignee of the instant application.

Although there has been shown and described specific structures, it is to be clearly understood that the same were merely for the purpose of illustration and that changes and modifications may readily be made therein by those skilled in the art without departing from the spirit and scope of the invention.

We claim as our invention:

1. A gas-blast circuit interrupter including a generally horizontally positioned elongated cylindrical tank component having upstanding support boss portions adjacent the opposite ends thereof, a pair of terminal bushings extending downwardly through said upstanding support boss portions, an elongated arc-extinguishing assemblage supported by the interior ends of the pair of terminal bushings, the assemblage including a high-voltage, high-pressure storage tank for gas-blast arc-extinguishing purposes, and the assemblage electrically interconnecting the lower ends of said terminal bushings interiorly of said horizontally positioned elongated tank component.

2. A fluid-blast circuit interrupter including a generally horizontally positioned elongated cylindrical tank component having upstanding support boss portions at the opposite ends thereof, a pair of terminal bushings extending downwardly through said upstanding support boss portions, an arc-extinguishing assemblage including a plurality or serially related fluid-blast arc-extinguishing units electrically interconnecting the lower ends of said terminal bushings interiorly of said horizontally positioned tank component, and a high-pressure fluid reservoir chamber constituting a portion of said arc-extinguishing assemblage for exhausting through an arc into said tank.

3. A circuit interrupter including means defining an exhaust tank, a pair of terminal bushings extending into said exhaust tank, an arc-extinguishing assemblage substantially supported at the interior ends of said terminal bushings, the arc-extinguishing assemblage including a unitary arc-extinguishing unit, said unit being adaptable for use with multiple other such unitary units in series and including a high-pressure reservoir chamber, separable contacts associated with said unit, an orifice structure associated with said unit, operating rod means operable to separate said contacts and draw an arc through said orifice structure of said unit a blast valve for controlling a blast of fluid from said chamber, and means movable with said operating rod means for opening said blast valve to cause a blast of gas out of said high-pressure reservoir, through said orifice structure to effect extinction of the arc drawn within said unit.

4. The combination in a compressed gas circuit interrupter of means defining an exhaust tank, a pair of terminal bushings extending into said exhaust tank, an arc-extinguishing assemblage substantially supported at the interior ends of said terminal bushings, the arc-extinguishing assemblage including a unitary arc-extinguishing unit, said arc-extinguishing unit including a high-pressure reservoir, a pair of separable contacts, an orifice structure, operating rod means movable lengthwise of the assemblage for causing separation of said pair of separable contacts associated with said unit, a blast valve, a pilot valve for dumping the gas in back of said blast valve, a valve lever for operating said pilot valve, and an actuating member movable with said operating rod means to rotate said valve lever during the opening operation.

5. A circuit interrupter including a pair of spaced upstanding support tubes, another tube at least partially interconnecting the lower ends of said support tubes, a terminal bushing extending downwardly within each support tube and supporting at the lower end thereof an arc-extinguishing assemblage including a plurality of serially related orifice-type arc-extinguishing units, a rigid connecting member electrically interconnecting the lower ends of the two arc-extinguishing assemblages and disposed within said other tube, a high-pressure fluid reservoir chamber associated with each arc-extinguishing assemblage and exhausting into the region partially defined by said upstanding support tubes, and operating rod means also disposed within said other tube to simultaneously actuate said arc-extinguishing assemblages.

6. A circuit interrupter including a horizontally extending exhaust tube enclosing a longitudinally extending fluid-blast arc-extinguishing assemblage, a pair of terminal bushings extending into opposite ends of said horizontally extending exhaust tube and supporting the ends of said fluid-blast arc-extinguishing assemblage, a high-pressure fluid-reservoir chamber constituting a portion of said arc-extinguishing assemblage, and a removable inspection cover disposed at one end of said tube.

7. A circuit interrupter including a pair of spaced upstanding elongated cylindrical tank components, a terminal bushing extending downwardly within each elongated cylindrical tank component, arc-extinguishing means including a plurality of end-to-end arc extinguishing units disposed at the lower interior end of each terminal bushing and closely enveloped by the respective elongated cylindrical tank component, a cylindrical base enclosure interconnecting the lower ends of the two cylindrical tank components, operating rod means extending longitudinally interiorly of said cylindrical enclosure for effecting simultaneous operation of said two arc-extinguishing means, the upstanding cylindrical tank components and the cylindrical enclosure constituting an exhaust chamber, each arc-extinguishing means including a high-pressure fluid reservoir chamber, valve means for exhausting high-pressure fluid from said high-pressure reservoir chamber through an arc and into said exhaust chamber, and an inspection cover disposed adjacent the lower end of at least one upstanding cylindrical tank component.

8. A circuit interrupter of the fluid-blast type including means at least partly of insulating material defining a relatively stationary orifice having a constricted portion, a relatively stationary contact mounted on the upstream side of the orifice and a movable rod-shaped contact separable to establish an arc through said constricted portion of said orifice, said movable rod-shaped contact having an extensive tubular portion at the contacting end thereof within which one terminal of the arc may elongate, fluid-pressure driving means for forcing fluid under pressure through said orifice to effect extinction of the arc, venting means associated with the tubular portion of the movable rod-shaped contact, and said relatively stationary contact having a rod-shaped arcing electrode protruding into said tubular portion in the closed circuit position of the interrupter.

9. The combination in a fluid-blast circuit interrupter of means defining a relatively stationary orifice having a constricted portion, means for drawing an arc through the constricted portion of said orifice including a relatively stationary contact mounted on the upstream side of the orifice and a cooperable rod-shaped movable contact, said movable rod-shaped contact having an extensive tubular portion at the contacting end thereof within which one terminal of the arc may elongate, lateral venting openings associated with said tubular portion, means for forcing fluid under pressure from the relatively-stationary-contact side of the constricted portion of the orifice and through the orifice to effect extinction of said drawn arc, and the relatively stationary contact having a rod-shaped arcing electrode which protrudes into the tubular portion of the movable contact in the closed-circuit position of the circuit interrupter.

10. A circuit interrupter adapted for high-voltage service including an elongated arc-extinguishing assemblage, exhaust tank means including a pair of terminal bushings for supporting said elongated arc-extinguishing assemblage at the ends thereof, the elongated arc-extinguishing assemblage including a plurality of serially related arc-extinguishing units, each of the arc-extinguishing units having an insulating orifice and an indivdual high-pressure reservoir chamber constituting a part thereof, contact means associated with each arc-extinguishing unit for drawing an arc through the insulating orifice of that particular unit, and valve means for simultaneously causing a blast of fluid from the plurality of high-pressure reservoir chambers to effect extinction of the plurality of serially related arcs within the insulating orifices.

11. The combination in a high-voltage fluid-blast circuit interrupter of dead-tank means for enclosing an elongated arc-extinguishing assemblage, a pair of supporting terminal bushings extending into said dead-tank means for supporting said arc-extinguishing assemblage, the arc-extinguishing assemblage including a plurality of serially related arc-extinguishing units, each unit having associated therewith means defining an insulating orifice and separable contact means for drawing an arc through the orifice, at least one high-pressure reservoir chamber associated with the arc-extinguishing assemblage for blasting fluid through at least one of the insulating orifices, and operating rod means movable lengthwise of the assemblage for simultaneously drawing the arcs within the several orifices of the arc-extinguishing units.

12. A circuit interrupter for high-voltage service including a dead metallic tank having a pair of terminal bushings extending thereinto, an elongated arc-extinguishing assemblage disposed within said dead metallic tank, the interior ends of the terminal bushings constituting substantially the sole support for the ends of said elongated arc-extinguishing assemblage, the arc-extinguishing assemblage including a plurality of serially related arc-extinguishing units, each unit having associated therewith means defining an insulating orifice and separable contact means for drawing an arc through the orifice, at least one high-pressure reservoir chamber associated with the arc-extinguishing assemblage for blasting fluid through at least one of the insulating orifices, and operating rod means movable lengthwise of the assemblage for simultaneously drawing the arcs within the several orifices of the arc-extinguishing units.

13. The combination in a high-voltage, fluid-blast circuit interrupter of a generally horizontally extending dead metallic tank, a pair of terminal bushings extending downwardly into said dead tank adjacent the ends thereof, the lower interior ends of the terminal bushings supporting rigidly into position an elongated, multiple-unit, arc-extinguishing assemblage, a high-pressure reservoir constituting a portion of the arc-extinguishing assemblage, a ladder-like movable contact assemblage including a pair of longitudinally extending operating rods bridged by cross-bars supporting movable contacts, relatively stationary contacts cooperable with the several movable contacts to establish a plurality of serially related arcs, means defining an insulating orifice associated with each arc-extinguishing unit, and said high-pressure reservoir exhausting through at least one orifice and into the dead metallic tank during the opening operation of the fluid-blast circuit interrupter for arc extinction.

14. A high-voltage, fluid-blast circuit interrupter including a generally horizontally extending dead metallic tank constituting an exhaust chamber, a pair of terminal bushings extending downwardly into the tank adjacent the ends thereof, support brackets disposed at the interior ends of the two terminal bushings, the two support brackets supporting fixedly into position an elongated, multiple-unit, arc-extinguishing assemblage, a plurality of serially related, orifice-type arc-extinguishing units constituting a portion of said arc-extinguishing assemblage, a high-pressure reservoir chamber disposed adjacent one end of said arc extinguishing assemblage and constituting a portion thereof, a ladder-like movable contact assemblage including a pair of longitudinally extending operating rods bridged by cross-bars supporting movable contacts, relatively stationary contacts cooperable with the several movable contacts to establish a plurality of serially related arcs, means defining an insulating orifice associated with each arc-extinguishing unit, and said high-pressure reservoir exhausting through at least one orifice and into the dead metallic tank during the opening operation of the fluid-blast circuit interrupter for arc extinction.

15. A compressed gas circuit interrupter including a pair of spaced upstanding elongated cylindrical tank components, a terminal bushing extending downwardly within each elongated cylindrical tank component with the lower end of the terminal bushing terminating adjacent the upper end of the elongated tank component, an elongated arc-extinguishing assemblage extending substantially coaxially of each elongated cylindrical tank component and supported from the lower end of each terminal bushing, each arc-extinguishing assemblage including a plurality of arc-extinguishing units positioned in end-to-end relationship and closely enveloped by its respective tank component to conserve space, a horizontally extending elongated cylindrical base tank component, the two upstanding tank components and the base tank component collectively constituting in part a common exhaust chamber, a pair of high pressure fluid reservoir chambers disposed interiorly within said common exhaust chamber and constituting a portion of each arc-extinguishing assemblage, at least one of the arc-extinguishing units of each assemblage including orifice means, valve means for each assemblage for controlling a blast of high pressure fluid from the reservoir chamber to the respective orifice means and into said common exhaust chamber, and elongated operating rod means extending longitudinally interiorly of said cylindrical base component for effecting simultaneous operation of said two arc-extinguishing assemblages.

16. A circuit interrupter including a pair of spaced upstanding cylindrical elongated tank components, a terminal bushing extending downwardly within each elongated cylindrical tank component, an elongated arc-extinguishing assemblage including a plurality of serially related arc-extinguishing units positioned in end-to-end relationship and depending from the interior end of each terminal bushing, the walls of the upstanding cylindrical tank components being closely spaced to the elongated arc-extinguishing assemblages to conserve space, a horizontally extending elongated cylindrical enclosure interconnecting the lower ends of the two upstanding cylindrical tank components, the spaced upstanding cylindrical tank components and the cylindrical enclosure constituting collectively an exhaust chamber, a high pressure fluid reservoir chamber disposed interiorly within said exhaust chamber and constituting a portion of the arc-extinguishing assemblage, at least one of the arc-extinguishing units including orifice means, valve means for controlling a blast of high pressure fluid from said reservoir chamber through the orifice means and into said exhaust chamber, and operating rod means extending longitudinally interiorly of said horizontally extending cylindrical enclosure for effecting simultaneous operation of said two arc-extinguishing assemblages.

17. A high-power compressed-gas circuit interrupter of compact dimensions and of relatively small interior volume suitable for utilizing a relatively high-dielectric-strength gas, such as sulfur hexafluoride, selenium hexafluoride, or the like, including an elongated cylindrical grounded exhaust tank, a pair of spaced terminal bushings extending interiorly into said elongated grounded exhaust tank adjacent opposite ends thereof, an elongated multiple-break arc-extinguishing assemblage supported at least in part from the interior ends of the terminal bushings and extending longitudinally along said exhaust tank substantially coaxially thereof, the walls of the grounded exhaust tank being closely spaced to the outer sides of the elongated arc-extinguishing assemblage by virtue of the employment of the relatively high-dielectric-strength gas, a movable contact assemblage including a plurality of serially related movable contacts movable longitudinally of said elongated arc-extinguishing assemblage, a cooperable relatively stationary contact assemblage including a plurality of serially related relatively stationary contacts, the movable contacts separating from the relatively stationary contacts to form a plurality of serially related gaps in the circuit, a high-pressure gas reservoir disposed at high potential and constituting a part of said elongated arc-extinguishig assemblage, blast-valve means synchronized with opening movement of the movable contact structure and operable to release a blast of high-pressure gas from said high-potential high-pressure gas reservoir toward at least one of said contact gaps for arc-extinguishing purposes, and the blast of gas exhausting into the general interior of the grounded exhaust tank.

18. A high-power compressed-gas circuit interrupter of compact dimensions and of relatively small interior volume suitable for utilizing a relatively high-dielectric-strength gas, such as sulfur hexafluoride, selenium hexafluoride, or the like, including an elongated cylindrical grounded exhaust tank, a pair of spaced terminal bushings extending interiorly into said elongated grounded exhaust tank adjacent opposite ends thereof, an elongated multiple-break arc-extinguishing assemblage supported at least in part from the interior ends of the terminal bushings and extending longitudinally along said exhaust tank substantially coaxially thereof, the walls of the grounded exhaust tank being closely spaced to the outer sides of the elongated arc-extnguishing assemblage by virtue of the employment of the relatively high-dielectric-strength gas, a movable contact assemblage including a plurality of serially related movable contacts movable longitudinally of said elongated arc-extinguishing assemblage, a cooperable relatively stationary contact assemblage including a plurality of serially related relatively stationary contacts, the movable contacts separating from the relatively stationary contacts to form a plurality of serially related gaps in the circuit, a high-pressure gas reservoir disposed at high potential and constituting a part of said elongated arc-extinguishing assemblage, blast-valve means synchronized with opening movement of the movable contact structure and operable to release a blast of high-pressure gas from said high-potential high-pressure gas reservoir toward at least one of said contact gaps for arc-extinguishing purposes, the blast of gas exhausting into the general interior of the grounded exhaust tank, an insulating feed conduit extending from said high-pressure gas reservoir to the wall of the exhaust tank, and means for withdrawing gas from the general interior of the exhaust tank to prevent the pressure attaining an excessive level therein.

19. The combination in a fluid-blast circuit interrupter of an elongated cylindrical grounded exhaust tank, a pair of spaced terminal bushings extending into said exhaust tank and supporting an elongated arc-extinguishing assemblage substantially coaxially of said cylindrical tank, the elongated arc-extinguishing assemblage including a plurality of serially related arc-extinguishing units, relatively stationary orifice means associated with each arc-extinguishing unit, a movable contact structure constituting a part of said elongated arc-extinguishing assemblage and operable to draw an arc through the orifice means of each arc-extinguishing unit, at least one high-pressure gas reservoir disposed at high potential and constitutng a part of said elongated arc-extinguishing assemblage, blast-valve means synchronized with the opening movement o the movable contact structure for controlling a blast of high-pressure gas from said high-pressure gas reservoir through at least one orifice means for arc-extinguishing purposes, and the gas blast exhausting into the general interior of the grounded tank.

20. A gas-blast circuit interrupter including a grounded metallic exhaust tank, a pair of terminal bushings extending interiorly into said grounded metallic exhaust tank, an elongated arc-extinguishing assemblage at least in part supported by the interior ends of said terminal bushings, a high-voltage high-pressure metallic reservoir tank secured to the interior foot of one terminal bushing and constituting one end of said elongated arc-extinguishing assemblage, movable contact structure including a plurality of movable contacts movable longitudinally of the arc-extinguishing assemblage, and blast valve means responsive to contact operation for controlling a blast of high-pressure gas from said high-voltage metallic reservoir toward at least one of the established arcs.

21. A gas-blast circuit interrupter including a grounded metallic exhaust tank, a pair of terminal bushings extending interiorly into said grounded metallic exhaust tank, an elongated arc-extinguishing assemblage at least in part supported by the interior ends of said terminal bushings, said grounded exhaust tank including an elongated cylindrical portion closely spaced about the arc-extinguishing assemblage, the elongated arc-extinguishing assemblage extending substantially coaxially along the cylindrical tank portion, a high-voltage high-pressure metallic reservoir tank secured to the interior foot of one terminal bushing and constituting one end of said elongated arc-extinguishing assemblage, movable contact structure including a plurality of movable contacts movable longitudinally of the arc-extinguishing assemblage, and blast valve means responsive to contact operation for controlling a blast of high-pressure gas from said high-voltage metallic reservoir toward at least one of the established arcs.

22. An arc-extinguishing assemblage for a compressed-gas circuit interrupter including a plurality of spaced orifice-type arc-extinguishing units, insulating rod means for spacing the arc-extinguishing units apart, a movable ladder-shaped contact assemblage including a plurality of rod-shaped movable contacts secured to substantially the mid-points of cross-braces, a plurality of cooperable relatively stationary contacts, a plurality of relatively stationary orifice structures through which the plurality of serially related arcs are drawn, at least one high-voltage high-pressure reservoir chamber for storing high-pressure gas, and blast valve means for controlling a flow of high-pressure gas through at least one orifice structure for directing the gas along at least one arc.

23. The combination in a high-power compressed-gas circuit interrupter of a pair of spaced supporting terminal bushings, an elongated arc-extinguishing assemblage supported between adjacent ends of the terminal bushings, said assemblage including a plurality of spaced orifice-type arc-extinguishing units, relatively stationary insulating support rod means supporting said units in spaced relation, a ladder-shaped movable contact assemblage constituting a part of said assemblage and carrying a plurality of rod-shaped movable contacts each movable rod-shaped contact withdrawing from an orifice structure, a high-potential high-pressure gas reservoir constituting a part of said arc-extinguishing assemblage, and blast valve means for controlling the flow of compressed gas out of said reservoir through at least one orifice-type arc-extinguishing unit.

References Cited in the file of this patent

UNITED STATES PATENTS

| | | |
|---|---|---|
| 976,549 | Cheney | Nov. 22, 1910 |
| 2,153,400 | Trencham | Apr. 4, 1939 |
| 2,163,558 | MacNeill | June 20, 1939 |
| 2,445,529 | Leeds | Jan. 20, 1948 |
| 2,459,599 | Strom | Jan. 18, 1949 |
| 2,459,600 | Strom | Jan. 18, 1949 |
| 2,459,612 | Baker | Jan. 18, 1949 |
| 2,598,446 | Schneider | May 27, 1952 |
| 2,790,880 | Florschutz et al. | Apr. 30, 1957 |
| 2,816,991 | Friedrich | Dec. 17, 1957 |
| 2,824,937 | Strom | Feb. 25, 1958 |

(Other references on following page)

FOREIGN PATENTS

| | | |
|---|---|---|
| 347,922 | Great Britain | May 7, 1931 |
| 457,877 | Great Britain | Dec. 2, 1936 |
| 196,779 | Switzerland | July 1, 1938 |
| 512,400 | Great Britain | Sept. 1, 1939 |
| 541,940 | Great Britain | Dec. 18, 1941 |
| 541,941 | Great Britain | Dec. 18, 1941 |
| 626,842 | Great Britain | July 21, 1949 |
| 695,051 | Germany | Aug. 15, 1940 |
| 87,834 | Sweden | Nov. 10, 1936 |